US012573724B2

(12) United States Patent
Zhang et al.

(10) Patent No.: US 12,573,724 B2
(45) Date of Patent: Mar. 10, 2026

(54) BATTERY CELL, BATTERY, ELECTRIC DEVICE, AND MANUFACTURING METHOD AND DEVICE OF BATTERY CELL

(71) Applicant: CONTEMPORARY AMPEREX TECHNOLOGY (HONG KONG) LIMITED, Hong Kong (CN)

(72) Inventors: Long Zhang, Ningde (CN); Biao Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 98 days.

(21) Appl. No.: 18/506,112

(22) Filed: Nov. 9, 2023

(65) Prior Publication Data

US 2024/0088528 A1    Mar. 14, 2024

Related U.S. Application Data

(63) Continuation of application No. PCT/CN2021/121739, filed on Sep. 29, 2021.

(51) Int. Cl.
*H01M 50/533* (2021.01)
*H01M 10/04* (2006.01)
(Continued)

(52) U.S. Cl.
CPC ..... *H01M 50/533* (2021.01); *H01M 10/0404* (2013.01); *H01M 10/0431* (2013.01);
(Continued)

(58) Field of Classification Search
CPC ............. H01M 50/533; H01M 50/586; H01M 50/595; H01M 10/0404; H01M 10/0431; H01M 2220/20
(Continued)

(56) References Cited

U.S. PATENT DOCUMENTS

2009/0274953 A1* 11/2009 Myers ................. H01M 50/103
429/100
2011/0311852 A1* 12/2011 Mineya ............. H01M 10/0587
429/94
(Continued)

FOREIGN PATENT DOCUMENTS

CN        206250261 U  †  6/2017
CN        207233885 U       4/2018
(Continued)

OTHER PUBLICATIONS

International Search Report received in the corresponding International Application PCT/CN2021/121739, mailed Jun. 23, 2022.
(Continued)

*Primary Examiner* — Niki Bakhtiari
*Assistant Examiner* — Omar M Kekia
(74) *Attorney, Agent, or Firm* — K&L Gates LLP

(57) ABSTRACT

Provided are a battery cell, a battery, an electric device, and a manufacturing method and device of battery cell. The battery cell includes: an adapting piece; an electrode assembly including a main body and a tab extending from the main body, where the tab includes a root section and a connecting section, the root section being connected to the main body and the connecting section being connected to the adapting piece; and a protective film including a first adhesive region, a second adhesive region, and a non-adhesive region located between the first adhesive region and the second adhesive region, where the first adhesive region is bonded to the main body, the second adhesive region is bonded to the connecting section, and the non-adhesive region covers the root section. The battery cell has prolonged service life.

19 Claims, 7 Drawing Sheets

(51) Int. Cl.
   *H01M 50/586*    (2021.01)
   *H01M 50/595*    (2021.01)
(52) U.S. Cl.
   CPC ....... *H01M 50/586* (2021.01); *H01M 50/595*
   (2021.01); *H01M 2220/20* (2013.01)
(58) Field of Classification Search
   USPC ......................................................... 429/94
   See application file for complete search history.

(56)                References Cited

U.S. PATENT DOCUMENTS

2013/0133184 A1* 5/2013 Bacci .................. H01G 9/0029
                                                     29/730
2020/0381765 A1  12/2020 Yang et al.

FOREIGN PATENT DOCUMENTS

CN       109698385  A  †  4/2019
CN       112332039  A     2/2021

| CN | 113131053 | A |   | 7/2021 |
| CN | 113131053 | B | † | 7/2021 |
| JP | 2004014516 | A |   | 1/2004 |
| JP | 2005243525 | A |   | 9/2005 |
| WO | 2018198469 | A1 |  | 11/2018 |
| WO | 2021176961 | A1 |  | 9/2021 |

OTHER PUBLICATIONS

Written Opinion received in the corresponding International Application PCT/CN2021/121739, mailed Jun. 23, 2022.
The extended European search report received in the corresponding European Application 21958752.4, mailed on Sep. 18, 2024.
Notice of Reasons for Refusal received in the corresponding Japanese Application 2023-527347, mailed on Jun. 18, 2024.
Office Action, mailed Oct. 2, 2025, for corresponding European Patent Application Serial No. 21958752.4.
Observations submitted by a third party concerning patentability, mailed Sep. 25, 2025, for corresponding European Patent Application Serial No. 21958752.4.

* cited by examiner
† cited by third party

| |
|---|
| Provide an adapting piece |  401 |
| Provide an electrode assembly |  402 |
| Provide a protective film |  403 |
| Connect a connecting section to the adapting piece |  404 |

500

501

502

BATTERY CELL, BATTERY, ELECTRIC DEVICE, AND MANUFACTURING METHOD AND DEVICE OF BATTERY CELL

CROSS-REFERENCE TO RELATED APPLICATIONS

This application is a continuation of International Application PCT/CN2021/121739, filed Sep. 29, 2021 and entitled "BATTERY CELL, BATTERY, ELECTRIC DEVICE, AND MANUFACTURING METHOD AND DEVICE OF BATTERY CELL", which is incorporated herein by reference in its entirety.

TECHNICAL FIELD

This application relates to the field of battery technologies, and in particular, to a battery cell, a battery, an electric device, and a manufacturing method and device of battery cell.

BACKGROUND

Energy conservation and emission reduction are crucial to sustainable development of the automobile industry. Electric vehicles, with their advantages in energy conservation and emission reduction, have become an important part of sustainable development of the automobile industry. For electric vehicles, battery technology is an important factor in connection with their development.

In the development of battery technology, in addition to safety improvement, service life is another non-negligible issue. Therefore, how service life of batteries is prolonged is an urgent technical problem that needs to be solved in battery technology.

SUMMARY

This application is intended to provide a battery cell, a battery, an electric device, and a manufacturing method and device of battery cell. The battery cell has prolonged service life.

This application is implemented using the following technical solutions.

According to a first aspect, this application provides a battery cell, including:

an adapting piece;

an electrode assembly, including a main body and a tab extending from the main body, where the tab includes a root section and a connecting section, the root section being connected to the main body and the connecting section being connected to the adapting piece; and a protective film, including a first adhesive region, a second adhesive region, and a non-adhesive region located between the first adhesive region and the second adhesive region, where the first adhesive region is bonded to the main body, the second adhesive region is bonded to the connecting section, and the non-adhesive region covers the root section.

For the battery cell according to the embodiments of this application, the non-adhesive region of the protective film covers the root section of the tab, so that when the protective film is bonded to the electrode assembly, a pulling force of the protective film on the root section of the tab can be reduced, which reduces cracking of the tab, guaranteeing current flow capacity of the tab and avoiding short circuit occurring because the cracked tab rips the protective film, thereby prolonging service life of the battery cell.

According to some embodiments of this application, the non-adhesive region exceeds a junction between the root section and the main body.

In the foregoing solution, a boundary on a side of the non-adhesive region exceeds the junction between the root section and the main body, so that the non-adhesive region covers the junction between the root section and the main body. Since the portion where the root section and the main body are connected is a weak portion of the root section, when the non-adhesive region covers the root section and part of the main body, a probability of tab cracking can be reduced when the tab is bonded to the protective film.

According to some embodiments of this application, the non-adhesive region exceeds a junction between the root section and the connecting section to cover part of the connecting section.

In the foregoing solution, a boundary of an end of the non-adhesive region connected to the second adhesive region exceeds the junction between the root section and the connecting section, so that the non-adhesive region covers the junction between the root section and the connecting section, which reduces a probability of cracking at the junction between the root section and the connecting section when the tab is bonded with the protective film.

According to some embodiments of this application, area of the connecting section covered by the non-adhesive region is S1, and total area of the connecting section is S2, where $\frac{1}{3} \le S1/S2 \le \frac{2}{3}$.

In the foregoing solution, with such ratio range for the non-adhesive region covering the connecting section, pulling of the protective film on the junction between the root section and the connecting section can be reduced when the protective film is bonded, and the probability of cracking at the junction between the root section and the connecting section is reduced when the protective film is bonded, thereby further ensuring a larger connecting area between the second adhesive region and the connecting section and guaranteeing connection stability of the protective film and the connecting section.

According to some embodiments of this application, one part of the second adhesive region is bonded to the connecting section, and the other part of the second adhesive region is bonded to the adapting piece.

In the foregoing solution, the second adhesive region is bonded to the connecting section and the adapting piece to improve connection stability of the tab and the adapting piece, thereby ensuring that the protective film is firmly bonded to the electrode assembly and the adapting piece.

According to some embodiments of this application, the electrode assembly includes a first end face and a first side face, the first end face being perpendicular to the first side face, the tab protrudes out of the first end face, and the protective film extends to the first side face.

In the foregoing solution, the first side face is connected to an edge of the first end face, and the protective film extends from the first end face to the first side face, which ensures a larger connecting area between the protective film and the main body, thereby improving connection stability of the protective film and the main body and ensuring firm connection between the protective film and the main body.

According to some embodiments of this application, the first adhesive region includes a first section and a second section, the first section being bonded to the first side face, and the second section being bonded to the first end face.

In the foregoing solution, the first section is bonded to the first side face, and the second section is bonded to the first end face, so that the first adhesive region has connection positions on two surfaces of the electrode assembly, which improves connection stability of the first adhesive region and the main body, thereby ensuring firm connection between the first adhesive region and the main body.

According to some embodiments of this application, length of the first section in a direction perpendicular to the first end face is L1, and length of the first side face in the direction perpendicular to the first end face is L2, where $\frac{1}{7} \leq L1/L2 \leq \frac{1}{5}$.

In the foregoing solution, with such ratio range with respect to the length of the first side face occupied by the first section in the direction perpendicular to the first end face, connection strength of the first section and the first side face can be guaranteed.

According to some embodiments of this application, the root section is provided with a bending part such that the adapting piece is parallel to the first end face.

In the foregoing solution, the root section is provided with the bending part such that the adapting piece is parallel to the first end face, and space between the main body and the adapting piece is reduced, which can reduce mounting space occupied by the tab and improve energy density of the battery cell.

According to some embodiments of this application, the protective film includes a protective film body and a covering member, the protective film body including an adhesive surface, the covering member covering part of the adhesive surface to form the non-adhesive region, and the part of the adhesive surface not covered by the covering member forming the first adhesive region and the second adhesive region.

In the foregoing solution, the protective film body may be an adhesive tape, and the covering member covers the protective film body to form the non-adhesive region, which has a simple structure and is easy to process.

According to a second aspect, this application provides a battery, including the battery cell according to the foregoing embodiments.

According to a third aspect, this application provides an electric device, including the battery cell according to the foregoing embodiments, where the battery cell is configured to supply electric energy.

According to a fourth aspect, this application provides a manufacturing method of battery cell, including:

providing an adapting piece;

providing an electrode assembly, where the electrode assembly includes a main body and a tab extending from the main body, and the tab includes a root section and a connecting section, the root section being connected to the main body;

providing a protective film, where the protective film includes a first adhesive region, a second adhesive region, and a non-adhesive region located between the first adhesive region and the second adhesive region; and connecting the connecting section to the adapting piece, bonding the first adhesive region to the main body and the second adhesive region to the connecting section, and covering the root section with the non-adhesive region.

According to a fifth aspect, this application provides a manufacturing device of battery cell, including:

a provision module, configured to provide an adapting piece, provide an electrode assembly, and provide a protective film, where the electrode assembly includes a main body and a tab extending from the main body, and the tab includes a root section and a connecting section, the root section being connected to the main body; and the protective film includes a first adhesive region, a second adhesive region, and a non-adhesive region located between the first adhesive region and the second adhesive region; and an assembling module, configured to connect the connecting section to the adapting piece, bond the first adhesive region to the main body and the second adhesive region to the connecting section, and cover the root section with the non-adhesive region.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following descriptions show merely some embodiments of this application, and persons of ordinary skill in the art may still derive other drawings from the accompanying drawings without creative efforts.

Figure 1:
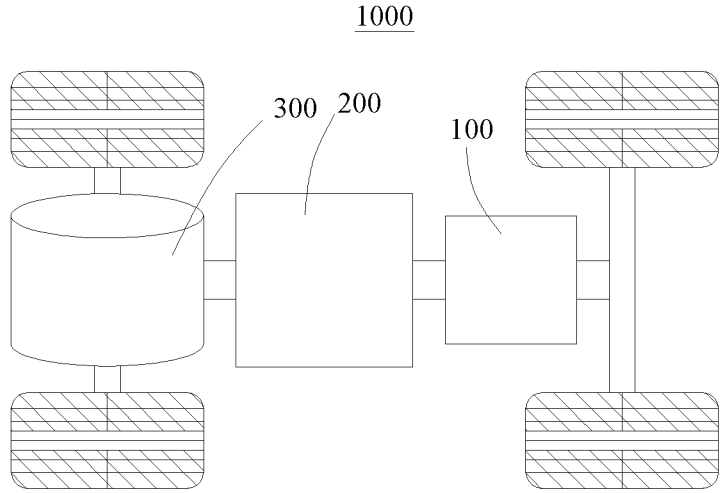
FIG. 1 is a schematic structural diagram of a vehicle according to some embodiments of this application.

In the accompanying drawings, the figures are not drawn to scale.

Reference signs: 100. battery; 10. box; 11. first portion; 12. second portion; 20. battery cell; 21. end cover; 22. housing; 23. electrode assembly; 231. main body; 232. tab; 2321. root section; 2322. connecting section; 2323. bending part; 233. first end face; 234. first side face; 235. second end face; 236. second side face; 237. positive electrode plate; 238. negative electrode plate; 239. separator; 24. adapting piece; 25. electrode terminal; 26. protective film; 261. first adhesive region; 2611. first section; 2612. second section; 262. second adhesive region; 263. non-adhesive region; 264. protective film body; 2641. adhesive surface; 265. covering member; 266. substrate; 267. adhesive layer; F1. first boundary; F2. second boundary; Z. thickness direction; 200. controller; 300. motor; and 1000. vehicle.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second" and the like are merely intended to distinguish between different objects, and shall not be understood as any indication or implication of relative importance or any implicit indication of the number, sequence or primary-secondary relationship of the technical features indicated. In the description of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, or may refer to a direct connection, an indirect connection via an intermediate medium, or an interaction between two elements. Persons of ordinary skill in the art can understand specific meanings of these terms in this application as appropriate to specific situations.

The battery mentioned in this application is a single physical module that includes one or more battery cells for providing a higher voltage and capacity. For example, the battery mentioned in this application may include a battery module, a battery pack, or the like.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. The part of positive electrode current collector uncoated with the positive electrode active substance layer protrudes out of the part of positive electrode current collector coated with the positive electrode active substance layer and serves as a positive tab. A lithium-ion battery is used as an example, for which, the positive electrode current collector may be made of aluminum and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied on a surface of the negative electrode current collector. The part of negative electrode current collector uncoated with the negative electrode active substance layer protrudes out of the part of negative electrode current collector coated with the negative electrode active substance layer and serves as a negative tab. The negative electrode current collector may be made of copper, and the negative electrode active substance may be carbon, silicon, or the like. To allow a large current to pass through without any fusing, multiple positive tabs are provided and stacked together, and multiple negative tabs are provided and stacked together. The separator may be made of PP (polypropylene, polypropylene), PE (polyethylene, polyethylene), or the like.

In this application, the electrode assembly includes a main body and a tab extending from the main body, where the tab includes a root section and a connecting section, the root section being connected to the main body and the connecting section being configured to be connected to the adapting piece.

For the development of battery technology, many design factors need to be considered, for example, performance parameters such as energy density, discharge capacity, and charge and discharge rate, as well as service life of the battery.

For a battery cell, there are many factors that affect service life, such as ambient temperature, component damage (such as tab cracking) caused by assembling, and lithium precipitation. The inventors have found through research that during production of battery, tab cracking may be caused by many factors, such as tab welding, tab bending, and adhesive application to the tab. The inventors have found through further research that a tab is prone to crack when the adhesive is applied to the tab after the tab is welded with an adapting piece.

During production of battery, to prevent short circuit in the battery, protective films (such as an adhesive tape) need to be attached to front and back of the tab after the tab is welded with the adapting piece. Currently, when an automatic adhesive applying equipment is applying the adhesive, a protective film of a specified size is fed into an adhesive applying mechanism to successively cover an edge of a large surface of an electrode assembly, a separator on an end face of the electrode assembly, and a root section and a connecting section of the tab. In order to ensure a fitting effect of the protective film and the tab, the root section of the tab is typically rolled to ensure tight fitting of the protective film and the tab. Because the root section of the tab is a weak portion of the tab, during adhesive application, when the tab is being rolled, the protective film applies a pulling force on the tab and the tab is prone to crack due to the pulling force of the protective film on the tab. When the tab cracks, current flow capacity of the tab is reduced, which easily causes temperature rise of a battery cell. In addition, the cracked part of the tab is prone to rip the protective film, which causes short circuit, thereby affecting service life of the battery cell.

In view of this, to resolve the problem of tab cracking, through in-depth research, the inventors have designed a battery cell. The battery cell includes an adapting piece, an electrode assembly, and a protective film. The electrode assembly includes a main body and a tab extending from the main body, where the tab includes a root section and a connecting section, the root section being connected to the main body and the connecting section being connected to the adapting piece. The protective film includes a first adhesive region, a second adhesive region, and a non-adhesive region located between the first adhesive region and the second adhesive region. The first adhesive region is bonded to the main body, the second adhesive region is bonded to the connecting section, and the non-adhesive region covers the root section so that the root section is not bonded.

In such battery cell, the non-adhesive region covers the root section, and therefore, when the protective film is bonded to the electrode assembly, there is no pulling between the non-adhesive region and the root section so that a pulling force of the protective film on the root section of the tab is reduced, which reduces cracking of the tab, guaranteeing current flow capacity of the tab and avoiding short circuit occurring because the cracked tab rips the protective film, thereby prolonging service life of the battery cell.

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application.

The battery cell disclosed in the embodiments of this application may be used without limitation in electric devices such as vehicles, ships, or aircrafts. The battery cell disclosed in this application may be used to constitute a power supply system of that electric device.

An embodiment of this application provides an electric device that uses a battery as a power source. The electric device may be, but is not limited to, a mobile phone, a tablet computer, a laptop computer, an electric toy, an electric tool, an electric bicycle, an electric motorcycle, an electric car, a ship, or a spacecraft. The electric toy may be a fixed or mobile electric toy, for example, a game console, an electric toy car, an electric toy ship, and an electric toy airplane. The spacecraft may include an airplane, a rocket, a space shuttle, a spaceship, and the like.

For ease of description, the electric device of an embodiment of this application being a vehicle is used as an example for description of the following embodiments.

Referring to FIG. 1, FIG. 1 is a schematic structural diagram of a vehicle 1000 according to some embodiments of this application. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like. The vehicle 1000 is provided with a battery 100 inside, where the battery 100 may be disposed at the bottom, front or rear of the vehicle 1000. The battery 100 may be configured to supply power to the vehicle 1000. For example, the battery 100 may be used as an operational power source for the vehicle 1000 which is configured for a circuit system of the vehicle 1000, for example, to satisfy power needs of start, navigation, and running of the vehicle 1000.

The vehicle 1000 may further include a controller 200 and a motor 300, where the controller 200 is configured to control the battery 100 to supply power to the motor 300, for example, to satisfy power needs of start, navigation, and driving of the vehicle 1000.

In some embodiments of this application, the battery 100 can be used as not only the operational power source for the vehicle 1000 but also a driving power source for the vehicle 1000, replacing or partially replacing fossil fuel or natural gas to provide driving traction for the vehicle 1000.

Figure 2:
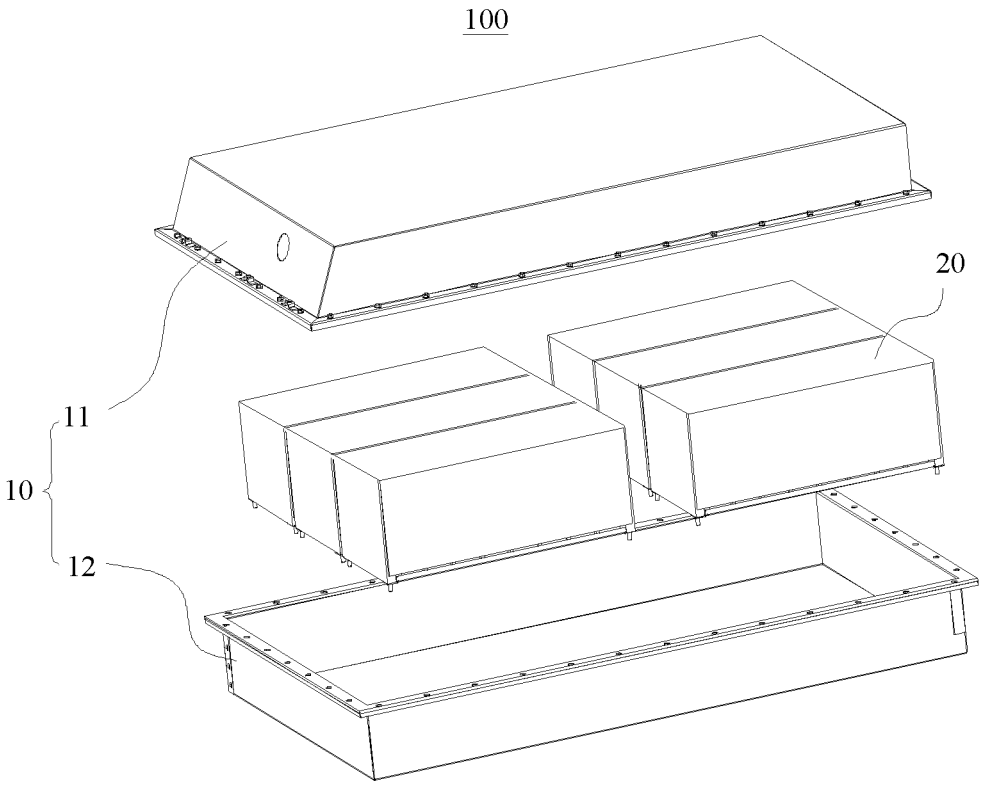
FIG. 2 is a schematic structural exploded view of a battery according to some embodiments of this application.

Referring to FIG. 2, FIG. 2 is a schematic structural exploded view of a battery 100 according to some embodiments of this application. The battery 100 includes a box 10 and a battery cell 20, where the battery cell 20 is accommodated in the box 10. The box 10 is configured to provide an accommodating space for the battery cell 20. The box 10 may be a variety of structures. In some embodiments, the box 10 may include a first portion 11 and a second portion 12. The first portion 11 and the second portion 12 fit together so that the first portion 11 and the second portion 12 jointly define a space for accommodating the battery cell 20. The second portion 12 may be a hollow structure with one end open, and the first portion 11 may be a plate structure, where the first portion 11 covers the open side of the second portion 12 for the first portion 11 and the second portion 12 to jointly define an accommodating space; or alternatively, the first portion 11 and the second portion 12 may both be hollow structures with one side open, where the open side of the first portion 11 is engaged with the open side of the second portion 12.

In the battery 100, the battery cell 20 are present in plurality, and the plurality of battery cells 20 may be connected in series, parallel, or series-parallel, where being connected in series-parallel means a combination of series and parallel connections of the plurality of battery cells 20. The plurality of battery cells 20 may be directly connected in series, parallel or series-parallel, and then an entirety of the plurality of battery cells 20 is accommodated in the box 10; or certainly, the battery 100 may be formed by a plurality of battery cells 20 being connected in series, parallel or series-parallel first to form a battery module and then a plurality of battery modules being connected in series, parallel or series-parallel to form an entirety which is accommodated in the box 10. The battery 100 may further include other structures. For example, the battery 100 may further include a busbar configured to implement electrical connection between the plurality of battery cells 20.

Each battery cell 20 may be a secondary battery or a primary battery, and may be a lithium-sulfur battery, a sodium-ion battery, or a magnesium-ion battery, without being limited thereto.

Figure 3:
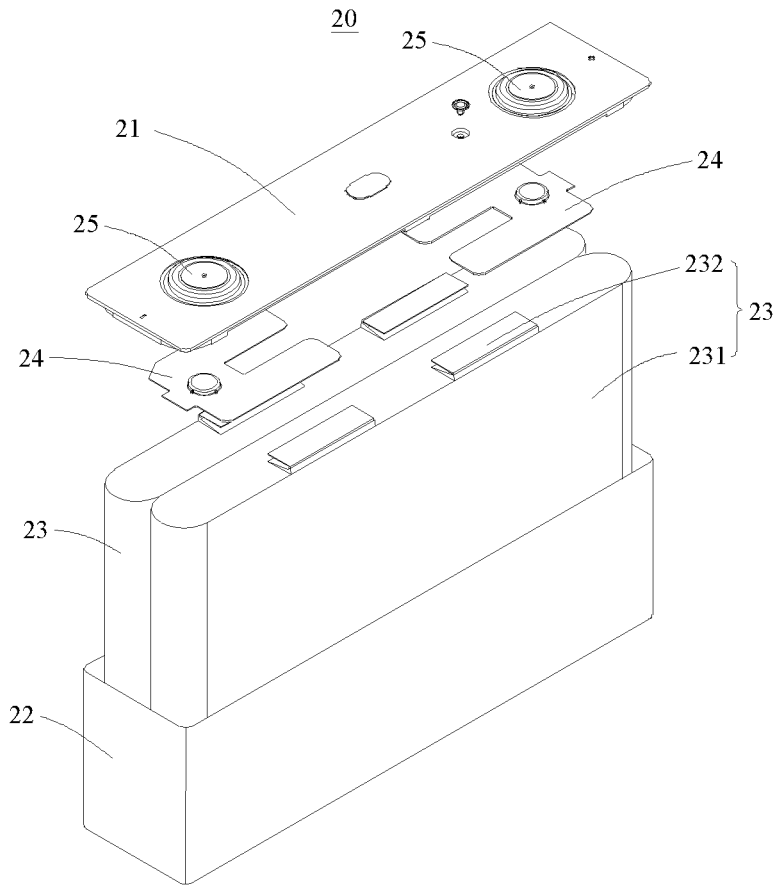
FIG. 3 is a schematic structural exploded view of a battery cell according to some embodiments of this application.

Referring to FIG. 3, FIG. 3 is a schematic structural exploded view of a battery cell 20 according to some embodiments of this application. The battery cell 20 refers to a smallest element constituting the battery 100. As shown in FIG. 3, the battery cell 20 includes an end cover 21, a housing 22, an electrode assembly 23, an adapting piece 24 and an electrode terminal 25.

The end cover 21 refers to a component that covers an opening of the housing 22 to isolate an internal environment of the battery cell 20 from an external environment. A shape of the end cover 21 is not limited and may be adapted to a shape of the housing 22 to fit the housing 22. Optionally, the end cover 21 may be made of a material with specified hardness and strength (for example, aluminum alloy), so that the end cover 21 is less likely to deform when subjected to extrusion and collision, allowing the battery cell 20 to have higher structural strength and enhanced safety performance. The end cover 21 may be provided with a pressure relief mechanism for releasing internal pressure when the internal pressure or a temperature of the battery cell 20 reaches a threshold. The end cover 21 may also be made of various materials, such as copper, iron, aluminum, stainless steel, aluminum alloy, and plastic, which are not particularly limited in the embodiments of this application. In some embodiments, an insulator may also be provided at an inner side of the end cover 21. The insulator may be configured to isolate an electrically connected component in the housing 22 from the end cover 21 to reduce a risk of short circuit. For example, the insulator may be made of plastic, a rubber, or the like.

The housing 22 is an assembly configured to form an internal environment of the battery cell 20 together with the end cover 21, where the formed internal environment may be configured to accommodate the electrode assembly 23, an electrolyte, and other components. The housing 22 and the end cover 21 may be independent components, an opening may be provided in the housing 22, and the end cover 21 covers the opening to form the internal environment of the battery cell 20. The end cover 21 and the housing 22 are not limited and may also be integrated. Specifically, the end cover 21 and the housing 22 may form a shared connection surface before other components are disposed inside the housing, and then the housing 22 is covered with the end cover 21 when inside of the housing 22 needs to be enclosed. A shape of the housing 22 may be determined according to a specific shape and size of the electrode assembly 23. The housing 22 may be made of various materials, such as copper, iron, aluminum, stainless steel, aluminum alloy, and plastic, which are not particularly limited in the embodiments of this application.

The electrode assembly 23 is a component in which electrochemical reactions occur in the battery cell 20. The housing 22 may include one or more electrode assemblies 23. The electrode assembly 23 is mainly formed by winding or stacking a positive electrode plate and a negative electrode plate, and a separator is generally provided between the positive electrode plate and the negative electrode plate. Parts of the positive electrode plate and the negative electrode plate with active substances constitute a main body 231 of the electrode assembly 23, while parts of the positive electrode plate and the negative electrode plate without active substances each constitute a tab 232. A positive tab and a negative tab may both be located at one end of the main body 231 or be located at two ends of the main body 231 respectively. In a charge and discharge process of the battery 100, a positive electrode active substance and a negative electrode active substance react with the electrolyte, and the tabs 232 are connected to the electrode terminals 25 via the adapting piece 24 to form a current loop.

The electrode terminal 25 is disposed on the end cover 21, and the electrode terminal 25 is electrically connected to the electrode assembly 23 via the adapting piece 24 for outputting or inputting electric energy of the battery cell 20.

Figure 4:
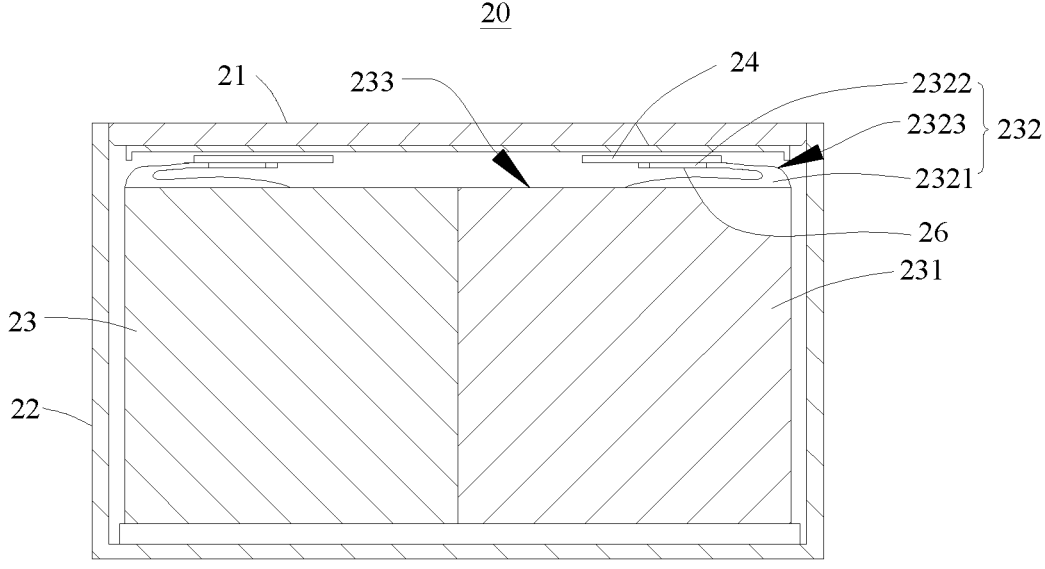
FIG. 4 is a cross-sectional view of a battery cell according to some embodiments of this application.
Figure 5:
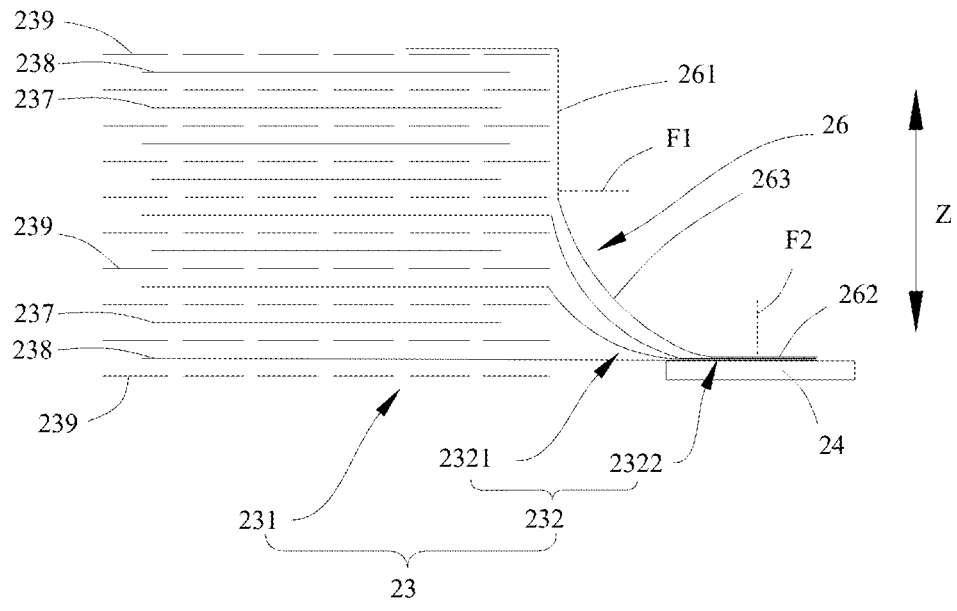
FIG. 5 is a first schematic diagram of a connection between an electrode assembly and an adapting piece according to some embodiments of this application.

According to some embodiments of this application, referring to FIG. 4, and further referring to FIG. 5, FIG. 4 is a cross-sectional view of a battery cell 20 according to some embodiments of this application; and FIG. 5 is a first schematic diagram of a connection between an electrode assembly 23 and an adapting piece 24 according to some embodiments of this application, where FIG. 5 is a schematic diagram illustrating that a tab 232 is connected to the adapting piece 24 before the tab 232 is bent. This application provides a battery cell 20. As shown in FIG. 4 and FIG. 5, the battery cell 20 includes an adapting piece 24, an electrode assembly 23, and a protective film 26. The electrode assembly 23 includes a main body 231 and a tab 232 extending from the main body 231, where the tab 232 includes a root section 2321 and a connecting section 2322, the root section 2321 being connected to the main body 231 and the connecting section 2322 being connected to the adapting piece 24. The protective film 26 includes a first adhesive region 261, a second adhesive region 262, and a non-adhesive region 263 located between the first adhesive region 261 and the second adhesive region 262. The first adhesive region 261 is bonded to the main body 231, the second adhesive region 262 is bonded to the connecting section 2322, and the non-adhesive region 263 covers the root section 2321.

FIG. 5 is a schematic diagram illustrating that the protective film 26 is bonded to the tab 232 before the tab 232 is bent. For ease of description of the non-adhesive region 263, in the figure, a first boundary F1 is a boundary between the first adhesive region 261 and the non-adhesive region 263, and a second boundary F2 is a boundary between the non-adhesive region 263 and the second adhesive region 262.

The adapting piece 24 is a conductive component configured to implement electrical connection between the tab 232 and the electrode terminal 25, so that electric energy of the electrode assembly 23 can be output through the electrode terminal 25 when the battery cell 20 is discharged, or electric energy can be input into the electrode assembly 23 through the electrode terminal 25 when the battery cell 20 is charged.

The electrode assembly 23 includes a positive electrode plate 237 and a negative electrode plate 238, where the positive electrode plate 237 and the negative electrode plate 238 are wound to form a coil structure. A separator 239 is provided between the positive electrode plate 237 and the negative electrode plate 238 to isolate the positive electrode plate 237 from the negative electrode plate 238. The electrode assembly 23 is flat with a tab 232 provided at each circle of electrode plate, and in a thickness direction Z of the electrode assembly 23, the tabs 232 are located one side of a winding axis of the electrode assembly 23. For example, as shown in FIG. 5, in the thickness direction Z of the electrode assembly 23, a lower half of the electrode assembly 23 is provided with a multi-layer tab 232. For ease of description, unless otherwise specified, the tab 232 in the embodiments of this application is a collective term for the multi-layer tab 232.

The connecting section 2322 of the tab 232 is electrically connected to the adapting piece 24. For example, the connecting section 2322 is welded to the adapting piece 24, or the connecting section 2322 and the adapting piece 24 are connected by a conductive adhesive. Optionally, the connecting section 2322 is welded to the adapting piece 24 to guarantee connection strength of the connecting section 2322 and the adapting piece 24.

The protective film 26 is an element for protecting the tab 232 to avoid internal short circuit of the battery cell 20. The protective film 26 may be an insulative adhesive tape.

The non-adhesive region 263 is a region of the protective film 26 that is not adhesive. When the protective film 26 fits the tab 232, the non-adhesive region 263 covers the root section 2321 of the tab 232 to shield the root section 2321, but the non-adhesive region 263 does not apply pulling force on the root section 2321. After the protective film 26 is connected to the tab 232, rolling the protective film 26 is intended to ensure tight fitting of the protective film 26 and the tab 232. Since the non-adhesive region 263 and the root section 2321 are not bonded together, only the protective film 26 is subjected to acting force of rolling. Therefore, when being pulled, the protective film 26 is not prone to transfer pulling force to the root section 2321, so that the tab 232 is not prone to crack.

The non-adhesive region 263 is located between the first adhesive region 261 and the second adhesive region 262. In other words, the first adhesive region 261 and the second adhesive region 262 are located on two opposite sides of the non-adhesive region 263. For example, the first adhesive region 261, the non-adhesive region 263, and the second adhesive region 262 may be arranged in sequence in an extension direction of the protective film 26, where the extension direction of the protective film 26 may be an extension direction of the tab 232. The protective film 26 covers the entire tab 232 and exceeds the tab 232 to protect the tab 232.

In the battery cell 20 according to the embodiments of this application, the non-adhesive region 263 of the protective film 26 covers the root section 2321 of the tab 232. When the protective film 26 is bonded to the electrode assembly 23, because the non-adhesive region 263 and the root section 2321 are not bonded together, a pulling force of the protective film 26 on the root section 2321 of the tab 232 can be reduced, which reduces cracking of the tab 232, guaranteeing current flow capacity of the tab 232 and avoiding short circuit occurring because the cracked tab 232 rips the protective film 26, thereby prolonging service life of the battery cell 20.

Figure 6:
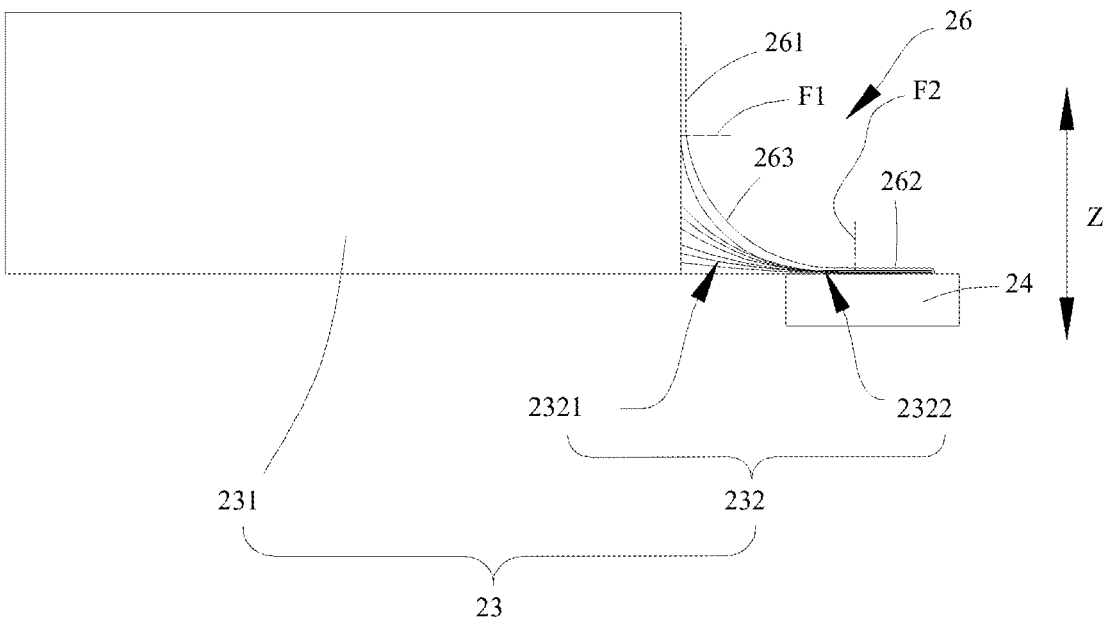
FIG. 6 is a second schematic diagram of a connection between an electrode assembly and an adapting piece according to some embodiments of this application.

Referring to FIG. 6, FIG. 6 is a second schematic diagram of a connection between an electrode assembly 23 and an adapting piece 24 according to some embodiments of this application, where FIG. 6 is a schematic diagram illustrating that a tab 232 is connected to the adapting piece 24 before the tab 232 is bent. According to some embodiments of this application, optionally, as shown in FIG. 5 and FIG. 6, the non-adhesive region 263 exceeds a junction between the root section 2321 and the main body 231.

The non-adhesive region 263 has two opposite ends with one end connected to the first adhesive region 261 and the other end connected to the second adhesive region 262. Since the first adhesive region 261 is bonded to the main body 231, the root section 2321 of the tab 232 is connected to the main body 231. The non-adhesive region 263 exceeding a junction between the root section 2321 and the main body 231 means that the end of the non-adhesive region 263 connected to the first adhesive region 261 exceeds the junction between the root section 2321 and the main body 231.

When the end of the non-adhesive region 263 connected to the first adhesive region 261 covers the junction between the root section 2321 and the main body 231, the non-adhesive region 263 covers the root section 2321 and part of the main body 231. Since the portion where the root section 2321 and the main body 231 are connected is a weak portion of the root section 2321, when the non-adhesive region 263 covers the root section 2321 and part of the main body 231, a probability of cracking of the tab 232 can be reduced when the tab 232 is bonded to the protective film 26.

According to some embodiments of this application, optionally, as shown in FIG. 5 and FIG. 6, the non-adhesive region 263 exceeds a junction between the root section 2321 and the connecting section 2322 to cover part of the connecting section 2322.

The non-adhesive region 263 has two opposite ends with one end connected to the second adhesive region 262. Since the second adhesive region 262 is bonded to the connecting section 2322, the non-adhesive region 263 exceeding a junction between the root section 2321 and the connecting section 2322 means that the end of the non-adhesive region 263 connected to the second adhesive region 262 exceeds the junction between the root section 2321 and connecting section 2322. In other words, the non-adhesive region 263 covers the junction between the root section 2321 and the connecting section 2322.

The non-adhesive region 263 covers the junction between the root section 2321 and the connecting section 2322 to protect the junction between the root section 2321 and the connecting section 2322, which reduces a probability of cracking at the junction between the root section 2321 and the connecting section 2322 when the tab 232 is bonded to the protective film 26.

Figure 7:
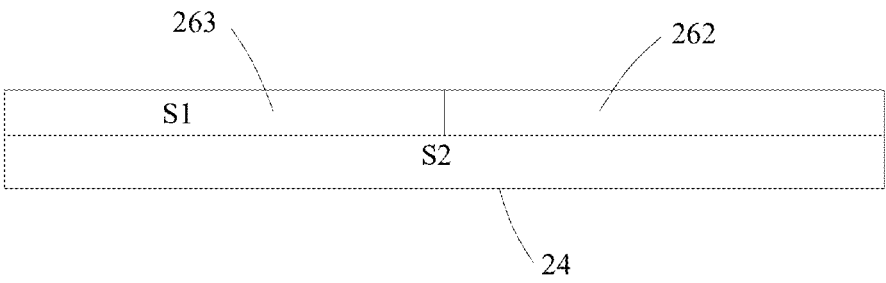
FIG. 7 is a schematic diagram of a connection between a protective film and a connecting section according to some embodiments of this application.

Referring to FIG. 7, FIG. 7 is a schematic diagram of a connection between a protective film 26 and a connecting section 2322 according to some embodiments of this application. According to some embodiments of this application, optionally, as shown in FIG. 7, area of the connecting section 2322 covered by the non-adhesive region 263 is S1, and total area of the connecting section 2322 is S2, where $\frac{1}{3} \le S1/S2 \le \frac{2}{3}$.

The area of the connecting section 2322 covered by the non-adhesive region 263 being S1 means that an area of the part of the non-adhesive region 263 covering the connecting section 2322 is S1. S1/S2 means S1 divided by S2, indicating a ratio of S1 to S2. A smaller value of S1/S2 indicates a smaller area of the connecting section 2322 covered by the non-adhesive region 263, thus a smaller area of the non-adhesive region 263 covering the junction between the root section 2321 and the connecting section 2322, which causes a poorer protecting effect on the root section 2321 and the connecting section 2322; or a larger value of S1/S2 indicates a larger area of the connecting section 2322 covered by the non-adhesive region 263 and a smaller bonding area between the connecting section 2322 and the second adhesive region 262, which affects connection strength of the second adhesive region 262 and the connecting section 2322.

With such value range of the ratio of the area of the connecting section 2322 covered by the non-adhesive region 263 to the total area of the connecting section 2322, pulling of the protective film 26 on the junction between the root section 2321 and the connecting section 2322 can be reduced when the protective film 26 is bonded, and the probability of cracking at the junction between the root section 2321 and the connecting section 2322 is reduced when the protective film 26 is bonded, thereby further ensuring a larger connecting area between the second adhesive region 262 and the connecting section 2322, and guaranteeing connection stability of the protective film 26 and the connecting section 2322.

Optionally, S1/S2=½, which not only ensures that the non-adhesive region 263 covers a larger area of the connecting section 2322, but also ensures firm connection between the second adhesive region 262 and the connecting section 2322.

Figure 8:
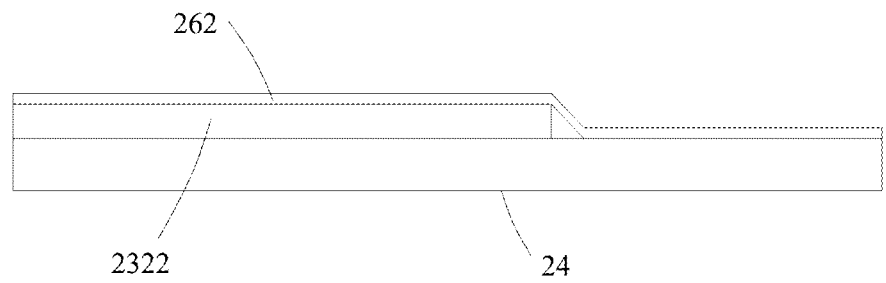
FIG. 8 is a schematic diagram of a connection between a second adhesive region and a connecting section according to some embodiments of this application.

Referring to FIG. 8, FIG. 8 is a schematic diagram of a connection between a second adhesive region 262 and a connecting section 2322 according to some embodiments of this application. According to some embodiments of this application, optionally, as shown in FIG. 8, one part of the second adhesive region 262 is bonded to the connecting section 2322, and the other part of the second adhesive region 262 is bonded to the adapting piece 24.

One part of the second adhesive region 262 is bonded to the connecting section 2322, and the other part of the second adhesive region 262 is bonded to the adapting piece 24. In other words, two ends of the second adhesive region 262 are bonded to the connecting section 2322 and the adapting piece 24 respectively, so that the second adhesive region 262 covers an end of the tab 232 away from the main body 231. That is, the second adhesive region 262 has increased extension length.

The second adhesive region 262 being bonded to the connecting section 2322 and the adapting piece 24 and the second adhesive region 262 covering an end of the tab 232 can prevent the multi-layer tab 232 from being loosen and improve connection stability of the tab 232 and the adapting piece 24, thereby ensuring that the protective film 26 is firmly bonded to the electrode assembly 23 and the adapting piece 24.

Figure 9:
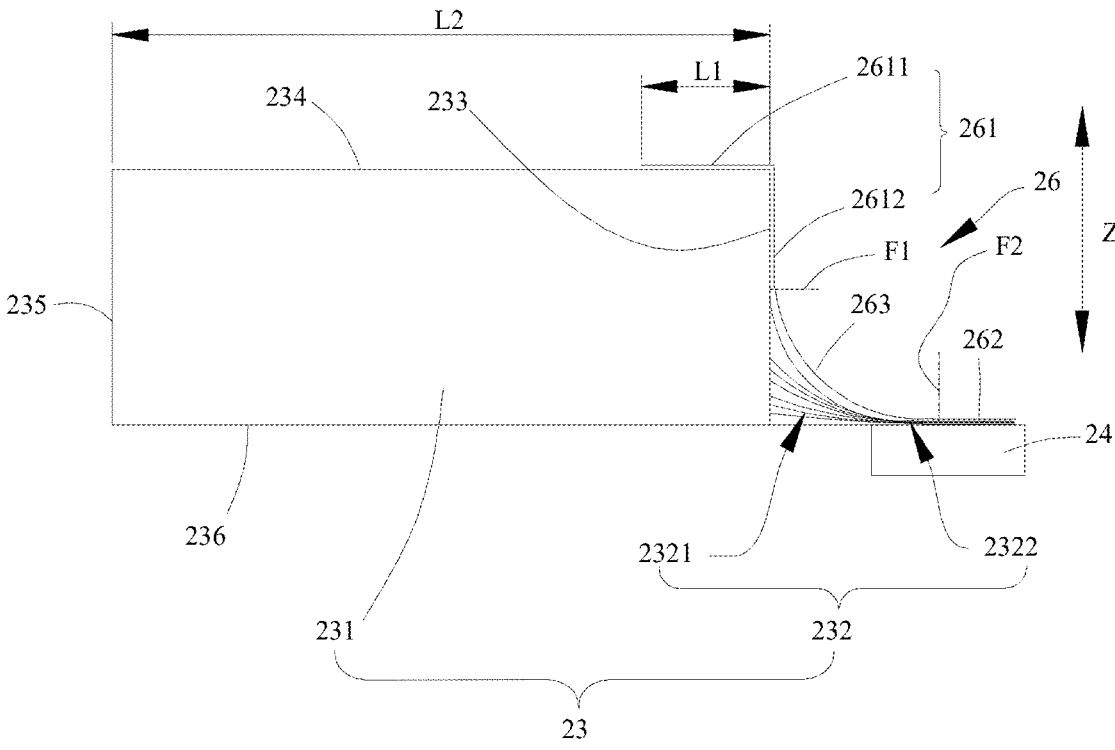
FIG. 9 is a schematic diagram of a connection between an electrode assembly and a protective film according to some embodiments of this application.

Referring to FIG. 9, FIG. 9 is a schematic diagram of a connection between an electrode assembly 23 and a protective film 26 according to some embodiments of this application, where FIG. 9 is a schematic diagram illustrating that a tab 232 is connected to the adapting piece 24 before the tab 232 is bent. According to some embodiments of this application, optionally, as shown in FIG. 9, the electrode assembly 23 includes a first end face 233 and a first side face 234, the first end face 233 being perpendicular to the first side face 234, the tab 232 protrudes out of the first end face 233, and the protective film 26 extends to the first side face 234.

The electrode assembly 23 is a winding structure and is flat, and the electrode assembly 23 has the thickness direction Z and a width direction. The electrode assembly 23 further includes a second end face 235, where the second end face 235 and the first end face 233 are two opposite surfaces of the electrode assembly 23 in the width direction, and the first end face 233 is an end face extending from the tab 232 of the electrode assembly 23.

The electrode assembly 23 further includes a second side face 236, where the first side face 234 and the second side face 236 are two opposite surfaces of the electrode assembly 23 in the thickness direction Z, and in the thickness direction Z of the electrode assembly 23, the root section 2321 of the tab 232 is close to the second side face 236 and away from the first side face 234. The first side face 234 and the second side face 236 are both connected to the first end face 233 and the second end face 235. The first side face 234 is perpendicular to the first end face 233, the second side face 236 is perpendicular to the first end 233, the first side face 234 is connected to an edge of the first end 233, and the second side face 236 is connected to an edge of the first end face 233.

The protective film 26 extends from the first end face 233 to the first side face 234, so that there is a larger connecting area between the protective film 26 and the main body 231, which improves connection stability of the protective film 26 and the main body 231, thereby ensuring firm connection between the protective film 26 and the main body 231.

According to some embodiments of this application, optionally, as shown in FIG. 9, the first adhesive region 261 includes a first section 2611 and a second section 2612, the first section 2611 being bonded to the first side face 234, and the second section 2612 being bonded to the first end face 233.

The first section 2611 and the second section 2612 are arranged adjacent to each other. When the first adhesive region 261 is bonded to the main body 231, the first section 2611 is bonded to the first side face 234, and the second section 2612 is bonded to the first end face 233, so that the first adhesive region 261 has connection positions on two surfaces of the electrode assembly 23, which improves connection stability of the first adhesive region 261 and the main body 231, thereby ensuring firm connection between the first adhesive region 261 and the main body 231.

According to some embodiments of this application, optionally, as shown in FIG. 9, length of the first section 2611 in a direction perpendicular to the first end face 233 is L1, and length of the first side face 234 in the direction perpendicular to the first end face 233 is L2, where $\frac{1}{7} \le L1/L2 \le \frac{1}{5}$.

The length L1 of the first section 2611 in the direction perpendicular to the first end face 233 refers to length of a projection of the first section 2611 in the direction perpendicular to the first end face 233 in a plane perpendicular to the first end face 233, that is, extension length of the first section 2611 on the first side face 234.

The length L2 of the first side face 234 in the direction perpendicular to the first end face 233 refers to length of the first side face 234 in the width direction of the electrode assembly 23. L1/L2 means L1 divided by L2, indicating a ratio of L1 to L2.

When $\frac{1}{7} \leq L1/L2 \leq \frac{1}{5}$, connection strength of the first section 2611 and the first side face 234 can be guaranteed. An excessively large value of L1/L2 indicates an excessively large length occupied by the first section 2611 in the direction perpendicular to the first end face 233, which increases costs; or an excessively small value of L1/L2 indicates an excessively small length occupied by the first section 2611 in the direction perpendicular to the first end face 233, which affects connection stability of the first section 2611 and the first side face 234.

Optionally, $L1/L2=\frac{1}{6}$, which guarantees connection stability of the first section 2611 and the first side face 234.

According to some embodiments of this application, as shown in FIG. 4, optionally, the root section 2321 is provided with a bending part 2323 such that the adapting piece 24 is parallel to the first end face 233.

The bending part 2323 is a bending portion at the root section 2321 after bending of the tab 232.

The root section 2321 is provided with the bending part 2323 such that the adapting piece 24 is parallel to the first end face 233, and space between the main body 231 and the adapting piece 24 is reduced, which can reduce mounting space occupied by the tab 232 and improve energy density of the battery cell 20.

Figure 10:
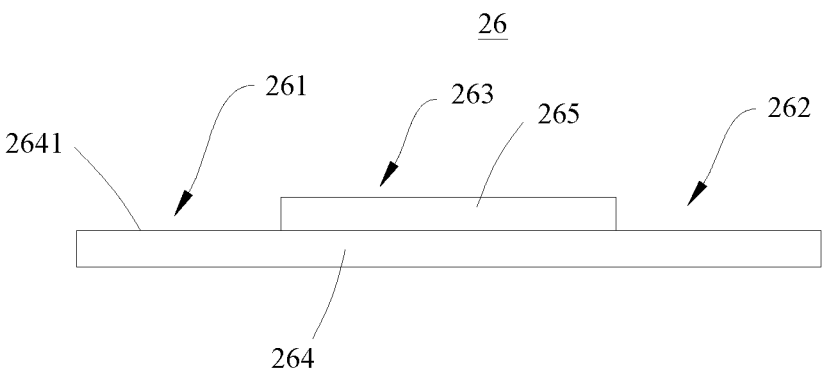
FIG. 10 is a schematic structural diagram of a protective film according to some embodiments of this application.

Referring to FIG. 10, FIG. 10 is a schematic structural diagram of a protective film 26 according to some embodiments of this application. According to some embodiments of this application, optionally, as shown in FIG. 10, the protective film 26 includes a protective film body 264 and a covering member 265, the protective film body 264 including an adhesive surface 2641, the covering member 265 covering part of the adhesive surface 2641 to form the non-adhesive region 263, and the part of the adhesive surface 2641 not covered by the covering member 265 forming the first adhesive region 261 and the second adhesive region 262.

The protective film body 264 has an adhesive surface 2641, and the protective film body 264 may be an adhesive tape. The covering member 265 is configured to cover the adhesive surface 2641, where a surface of the covering member 265 facing toward the adhesive surface 2641 may be adhesive or may be not adhesive. When the surface of the covering member 265 facing toward the adhesive surface 2641 is adhesive, the covering member 265 may be an adhesive tape, which increases connection strength of the covering member 265 and the protective film body 264.

The surface of the covering member 265 facing away from the adhesive surface 2641 is not adhesive, when the covering member 265 covers the adhesive surface 2641, the covering member 265 is bonded to the protective film body 264, which ensures that the region of the protective film body 264 covered by the covering member 265 forms the non-adhesive region 263.

In the foregoing solution, the protective film body 264 may be an adhesive tape, and the covering member 265 covers the protective film body 264 to form the non-adhesive region 263, which has a simple structure and is easy to process. The adhesive tape may be a structure with adhesive applied on one side, a material of which may be but is not limited to polyvinyl chloride, polyethylene, polypropylene, or polyethylene terephthalate.

Figure 11:
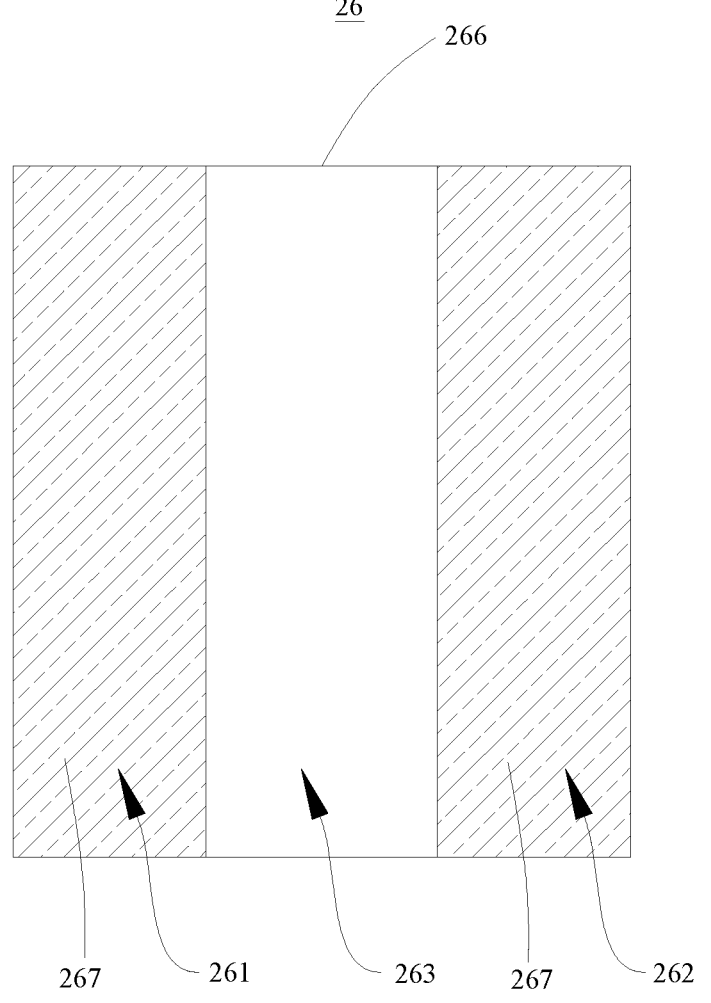
FIG. 11 is a schematic structural diagram of a protective film according to some other embodiments of this application.

Referring to FIG. 11, FIG. 11 is a schematic structural diagram of a protective film 26 according to some other embodiments of this application. According to some embodiments of this application, optionally, as shown in FIG. 11, the protective film 26 includes a substrate 266 and adhesive layers 267, where the adhesive layers 267 are applied onto two sides of a same surface of the substrate 266 to form the first adhesive region 261 and the second adhesive region 262, and the region of the substrate 266 not applied with the adhesive layer 267 forms the non-adhesive region 263.

The substrate 266 may be made of a material including but not limited to polyvinyl chloride, polyethylene, polypropylene, or polyethylene terephthalate.

Figure 12:
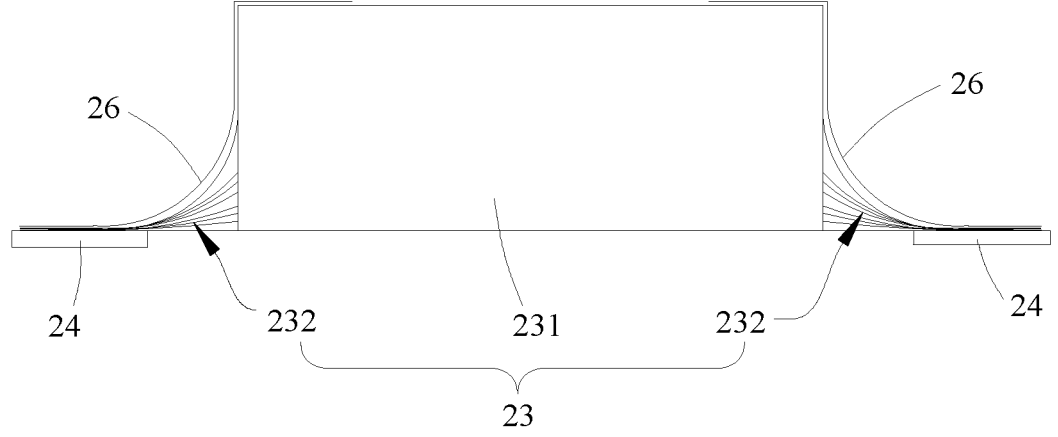
FIG. 12 is a schematic structural diagram of an electrode assembly according to some embodiments of this application.

Referring to FIG. 12, FIG. 12 is a schematic structural diagram of an electrode assembly 23 according to some embodiments of this application. According to some embodiments of this application, optionally, the electrode assembly 23 includes two tabs 232, one tab 232 being a positive tab and the other tab 232 being a negative tab. As shown in FIG. 9, the two tabs 232 may extend from one end of the main body 231; or as shown in FIG. 12, the two tabs 232 may alternatively extend from two ends of the main body 231.

Figure 13:
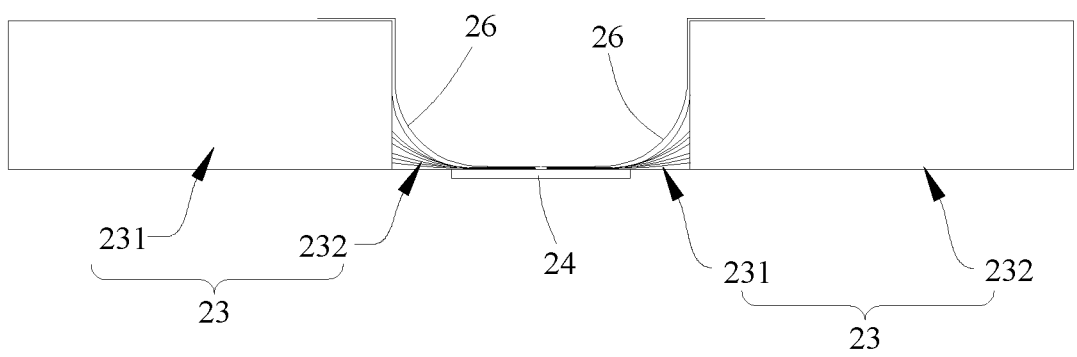
FIG. 13 is a schematic diagram of a connection between two electrode assemblies according to some embodiments of this application.

Referring to FIG. 13, FIG. 13 is a schematic diagram of a connection between two electrode assemblies 23 according to some embodiments of this application; According to some embodiments of this application, optionally, as shown in FIG. 13, the battery cell 20 has two electrode assemblies 23, where the two electrode assemblies 23 are both connected to one adapting piece 24.

According to some embodiments of this application, this application further provides a battery 100 including the battery cell 20 described in any one of the foregoing solutions.

According to some embodiments of this application, this application further provides an electric device, including the battery cell 20 described in any one of the foregoing solutions, where the battery cell 20 is configured to supply electric energy to the electric device.

The electric device may be any one of the foregoing devices or systems using the battery 100.

According to some embodiments of this application, referring to FIG. 9, this application provides a battery cell 20, and the battery cell 20 includes an adapting piece 24, an electrode assembly 23, and a protective film 26. The electrode assembly 23 includes a main body 231 and a tab 232 extending from the main body 231, where the main body 231 includes a first end face 233 and a first side face 234; and the tab 232 protrudes out of the first end face 233 and includes a root section 2321 and a connecting section 2322, the root section 2321 being connected to the main body 231 and the connecting section 2322 being connected to the adapting piece 24. The protective film 26 includes a first adhesive region 261, a second adhesive region 262, and a non-adhesive region 263 located between the first adhesive region 261 and the second adhesive region 262, where the first adhesive region 261 includes a first section 2611 and a second section 2612, the first section 2611 being bonded to the first side face 234, and the second section 2612 being bonded to the first end face 233; the second adhesive region 262 is bonded to the connecting section 2322 and the adapting piece 24; and the non-adhesive region 263 covers the root section 2321, where two ends of the non-adhesive region 263 exceed a junction between the root section 2321 and the main body 231 and a junction between the root section 2321 and the connecting section 2322 respectively.

The non-adhesive region 263 of the protective film 26 covers the root section 2321 of the tab 232, so that when the protective film 26 is bonded to the electrode assembly 23, a pulling force of the protective film 26 on the root section 2321 of the tab 232 can be reduced, which reduces cracking of the tab 232, guaranteeing current flow capacity of the tab 232 and avoiding short circuit occurring because the cracked tab 232 rips the protective film 26, thereby prolonging service life of the battery cell 20. Further, the non-adhesive region 263 is formed by covering a covering member 265 onto the protective film 26.

Figure 14:
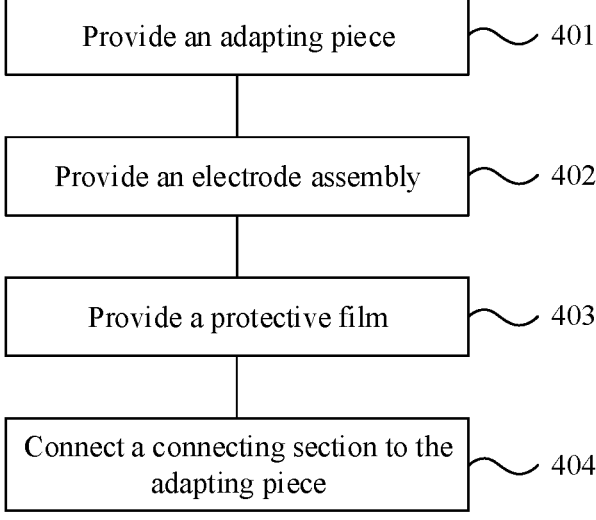
FIG. 14 is a schematic flowchart of a manufacturing method of battery cell according to some embodiments of this application.

FIG. 14 is a schematic flowchart of a manufacturing method of battery cell according to some embodiments of this application. According to some embodiments of this application, this application provides a manufacturing method of battery cell. As shown in FIG. 14, the manufacturing method of battery cell may include the following steps.

401. Provide an adapting piece 24.

402. Provide an electrode assembly 23, where the electrode assembly 23 includes a main body 231 and a tab 232 extending from the main body 231, and the tab 232 includes a root section 2321 and a connecting section 2322, the root section 2321 being connected to the main body 231.

403. Provide a protective film 26, where the protective film 26 includes a first adhesive region 261, a second adhesive region 262, and a non-adhesive region 263 located between the first adhesive region 261 and the second adhesive region 262.

404. Connect the connecting section 2322 to the adapting piece 24, bond the first adhesive region 261 to the main body 231 and the second adhesive region 262 to the connecting section 2322, and cover the root section 2321 with the non-adhesive region 263.

Figure 15:
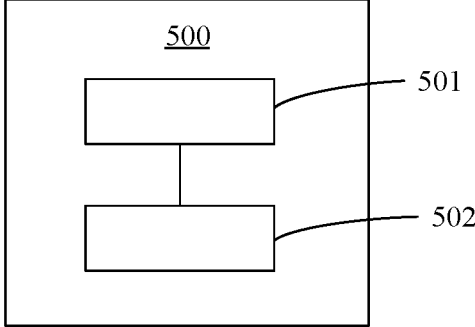
FIG. 15 is a schematic block diagram of a manufacturing device of battery cell according to some embodiments of this application.

FIG. 15 is a schematic block diagram of a manufacturing device 500 of battery cell according to some embodiments of this application. According to some embodiments of this application, this application provides a manufacturing device 500 of battery cell. As shown in FIG. 15, the manufacturing device 500 of battery cell includes a provision module 501 and an assembling module 502. The provision module 501 is configured to provide an adapting piece 24, provide an electrode assembly 23, and provide a protective film 26. The electrode assembly 23 includes a main body 231 and a tab 232 extending from the main body 231, where the tab 232 includes a root section 2321 and a connecting section 2322, the root section 2321 being connected to the main body 231; and the protective film 26 includes a first adhesive region 261, a second adhesive region 262, and a non-adhesive region 263 located between the first adhesive region 261 and the second adhesive region 262. The assembling module 502 is configured to connect the connecting section 2322 to the adapting piece 24, bond the first adhesive region 261 to the main body 231 and the second adhesive region 262 to the connecting section 2322, and cover the root section 2321 with the non-adhesive region 263.

Although this application has been described with reference to the preferred embodiments, various modifications to this application and replacements with equivalents of the components herein can be made without departing from the scope of this application. In particular, as long as there is no structural conflict, the various technical features mentioned in the embodiments can be combined in any manners. This application is not limited to the specific embodiments disclosed in this specification, but includes all technical solutions falling within the scope of the claims.

What is claimed is:

1. A battery cell, comprising:

an adapting piece;

an electrode assembly, comprising a main body and a tab extending from the main body, wherein the tab comprises a root section and a connecting section, the root section being connected to the main body and the connecting section being connected to the adapting piece; and a protective film, comprising a substrate and two adhesive layers, wherein the two adhesive layers are applied onto two side of a surface along an extension direction of the substrate to form a first adhesive region and a second adhesive region, respectively, and a region between the two adhesive layers on the surface of the substrate is not applied with the adhesive layers and forms a non-adhesive region located between the first adhesive region and the second adhesive region, wherein the first adhesive region is bonded to the main body, the second adhesive region is bonded to the connecting section, the non-adhesive region is a partial surface of the substrate, and the non-adhesive region covers the root section and is configured to reduce a pulling force of the protective film on the root section of the tab, wherein the protective film is configured to cover the tab entirely and exceed the tab in an extension direction of the tab to protect the tab.

2. The battery cell according to claim 1, wherein the non-adhesive region exceeds a junction between the root section and the main body and is configured to reduce a probability of cracking of the tab at the junction between the root section and the main body.

3. The battery cell according to claim 1, wherein the non-adhesive region exceeds a junction between the root section and the connecting section to cover part of the connecting section and is configured to reduce a probability of cracking of the tab at the junction between the root section and the connecting section.

4. The battery cell according to claim 1, wherein area of the connecting section covered by the non-adhesive region is S1 and total area of the connecting section is S2, wherein $\frac{1}{3} \leq S1/S2 \leq \frac{2}{3}$.

5. The battery cell according to claim 1, wherein one part of the second adhesive region is bonded to the connecting section and the other part of the second adhesive region is bonded to the adapting piece.

6. The battery cell according to claim 1, wherein the electrode assembly comprises a first end face and a first side face, the first end face being perpendicular to the first side face, the tab protrudes out of the first end face, and the protective film extends to the first side face.

7. The battery cell according to claim 6, wherein the first adhesive region comprises a first section and a second section, the first section being bonded to the first side face, and the second section being bonded to the first end face.

8. The battery cell according to claim 7, wherein length of the first section in a direction perpendicular to the first end face is L1 and length of the first side face in the direction perpendicular to the first end face is L2, wherein $\frac{1}{7} \leq L1/L2 \leq \frac{1}{5}$.

9. The battery cell according to claim 6, wherein the root section is provided with a bending part such that the adapting piece is parallel to the first end face.

10. The battery cell according to claim 1, wherein the protective film comprises a protective film body and a covering member, the protective film body comprising an adhesive surface, a surface of the covering member facing away from the adhesive surface of the protective film body is not adhesive, the covering member covering a part of the adhesive surface to form the non-adhesive region, and the part of the adhesive surface not covered by the covering member forming the first adhesive region and the second adhesive region.

11. The battery cell according to claim 10, wherein when a surface of the covering member facing toward the adhesive surface is adhesive, the covering member is configured to increase connection strength of the covering member and the protective film body.

12. A battery, comprising the battery cell according to claim 1.

13. An electric device, comprising the battery cell according to claim 1, wherein the battery cell is configured to supply electric energy.

14. The battery cell according to claim 1, wherein the first adhesive region, the non-adhesive region, and the second adhesive region are arranged in sequence in an extension direction of the protective film, the extension direction of the protective film is an extension direction of the tab.

15. The battery cell according to claim 1, wherein the protective film is an insulative adhesive tape, and the non-adhesive region is a part of the insulative adhesive tape.

16. The battery cell according to claim 1, wherein the non-adhesive region has two opposite ends with one of the two opposite ends connected to the first adhesive region and the other one of the two opposite ends connected to the second adhesive region, the root section of the tab is connected to the main body, the end of the non-adhesive region connected to the first adhesive region exceeds a junction between the root section and the main body.

17. The battery cell according to claim 1, wherein the non-adhesive region has two opposite ends with one of the two opposite ends connected to the first adhesive region and the other one of the two opposite ends connected to the second adhesive region, the end of the non-adhesive region connected to the second adhesive region exceeds a junction between the root section and connecting section.

18. A manufacturing method of battery cell, comprising:
providing an adapting piece;
providing an electrode assembly, wherein the electrode assembly comprises a main body and a tab extending from the main body, and the tab comprises a root section and a connecting section, the root section being connected to the main body;
providing a protective film, wherein the protective film comprises a substrate and two adhesive layers, wherein the two adhesive layers are applied onto two side of a surface along an extension direction of the substrate to form a first adhesive region and a second adhesive region, respectively, and a region between the two adhesive layers on the surface of the substrate is not applied with the adhesive layers and forms a non-adhesive region located between the first adhesive region and the second adhesive region, wherein the protective film is configured to cover the tab entirely and exceed the tab in an extension direction of the tab, the non-adhesive region is a partial surface of the substrate, and the non-adhesive region covers the root section and is configured to reduce a pulling force of the protective film on the root section; and
connecting the connecting section to the adapting piece, bonding the first adhesive region to the main body and the second adhesive region to the connecting section, and covering the root section with the non-adhesive region.

19. A manufacturing device of battery cell, comprising:
a provision module, configured to provide an adapting piece, provide an electrode assembly, and provide a protective film, wherein the electrode assembly comprises a main body and a tab extending from the main body, and the tab comprises a root section and a connecting section, the root section being connected to the main body; and the protective film comprises a substrate and two adhesive layers, wherein the two adhesive layers are applied onto two side of a surface along an extension direction of the substrate to form a first adhesive region and a second adhesive region, respectively, and a region between the two adhesive layers on the surface of the substrate is not applied with the adhesive layers and forms a non-adhesive region located between the first adhesive region and the second adhesive region, the protective film covers the tab entirely and exceeds the tab in an extension direction of the tab, the non-adhesive region is a partial surface of the substrate, and the non-adhesive region covers the root section and is configured to reduce a pulling force of the protective film on the root section; and
an assembling module, configured to connect the connecting section to the adapting piece, bond the first adhesive region to the main body and the second adhesive region to the connecting section, and cover the root section with the non-adhesive region.

* * * * *